(12) United States Patent
Shemtov

(10) Patent No.: US 7,635,816 B1
(45) Date of Patent: Dec. 22, 2009

(54) CONNECTOR / BUSHING ASSEMBLY FOR ELECTRICAL JUNCTION BOXES

(76) Inventor: Sami Shemtov, 1458 Commodore Way, Hollywood, FL (US) 33019

( * ) Notice: Subject to any disclaimer, the term of this patent is extended or adjusted under 35 U.S.C. 154(b) by 304 days.

(21) Appl. No.: 11/737,839

(22) Filed: Apr. 20, 2007

(51) Int. Cl.
*H02G 3/18* (2006.01)

(52) U.S. Cl. ........................ 174/650; 174/653; 174/665; 174/669; 174/152 G; 277/608; 16/2.2; 285/151.1

(58) Field of Classification Search ................. 174/480, 174/481, 650, 665, 659, 666, 668, 669, 152 G, 174/153 G, 152 R, 135, 50, 653; 277/606, 277/607, 609, 608; 220/3.2–3.9, 4.02; 439/535, 439/271, 272, 273; 285/149.1, 151.1, 154.1, 285/154.3, 154.4, 322, 323, 331, 345, 399; 16/2.1, 2.2
See application file for complete search history.

(56) References Cited

U.S. PATENT DOCUMENTS

| | | | |
|---|---|---|---|
| 3,281,155 A | 10/1966 | Kauffman | |
| 4,150,845 A | 4/1979 | Riuli et al. | |
| 4,258,936 A | 3/1981 | Goldberg | |
| 4,877,270 A | 10/1989 | Phillips | |
| 5,288,087 A | 2/1994 | Bertoldo | |
| 5,378,027 A | 1/1995 | Gehring | |
| 5,833,245 A | 11/1998 | Gallagher | |
| 5,903,964 A | 5/1999 | Uematsu et al. | |
| 5,912,431 A * | 6/1999 | Sheehan | 174/653 |
| 6,043,432 A * | 3/2000 | Gretz | 174/668 |
| 6,077,267 A | 6/2000 | Huene | |
| 6,102,444 A | 8/2000 | Kozey | |
| 6,168,168 B1 | 1/2001 | Brown | |
| 6,323,433 B1 * | 11/2001 | Mahaney et al. | 174/152 G |
| 6,335,488 B1 * | 1/2002 | Gretz | 174/153 G |
| 6,359,355 B1 | 3/2002 | Hartsfield et al. | |
| 6,481,722 B1 | 11/2002 | Shaffer | |
| 6,541,720 B2 | 4/2003 | Gerald et al. | |
| 6,808,181 B1 | 10/2004 | Shemtov | |
| 7,214,890 B2 * | 5/2007 | Kiely et al. | 174/666 |

\* cited by examiner

*Primary Examiner*—Angel R Estrada
(74) *Attorney, Agent, or Firm*—Craig A. Fieschko, Esq.; DeWitt Ross & Stevens S.C.

(57) ABSTRACT

A connector/bushing assembly for electrical junction boxes includes a nut which may receive a male conduit/connector which extends through the wall of a junction box, and a liner situated within the nut. The nut receives the male connector within a nut junction end situated opposite from a nut entry end. The liner is received within the nut entry end to extend toward the nut junction end, and includes a floating portion near the nut junction end, with the floating portion defining a cylinder spaced from the inner diameter of the nut junction end so that the (cylindrical) male connector can be received within the nut junction end between the floating portion and the nut junction end.

20 Claims, 3 Drawing Sheets

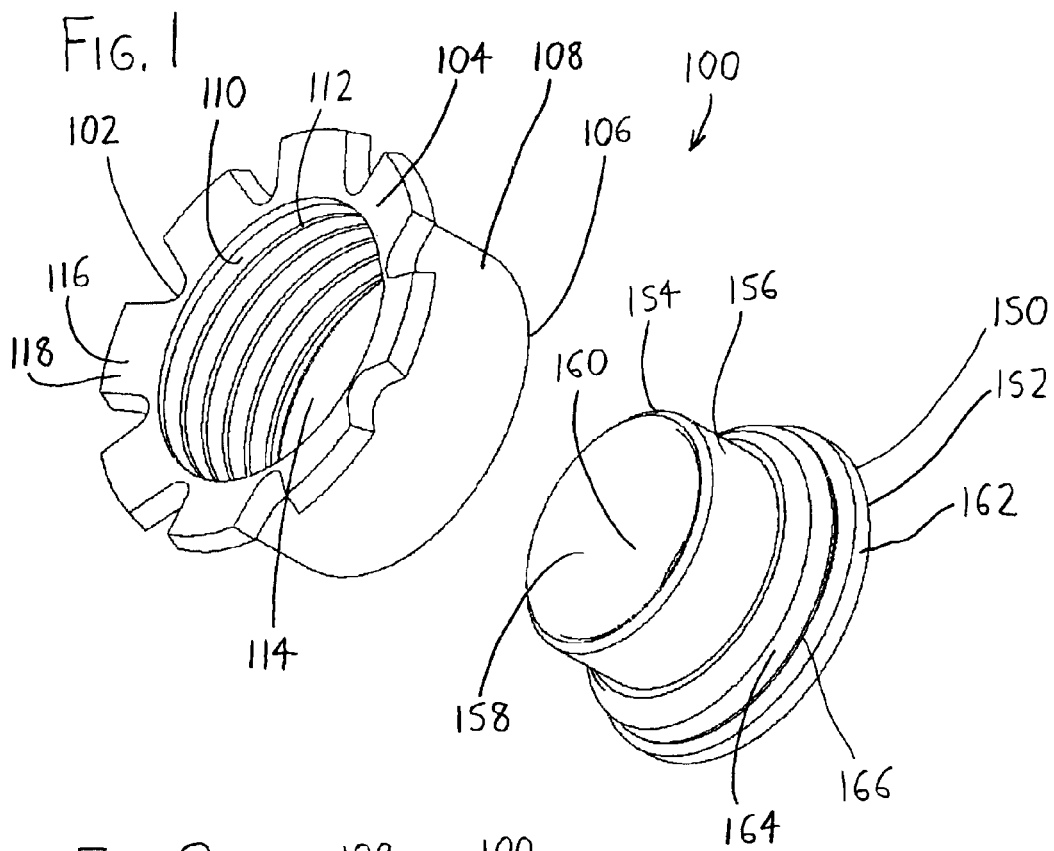
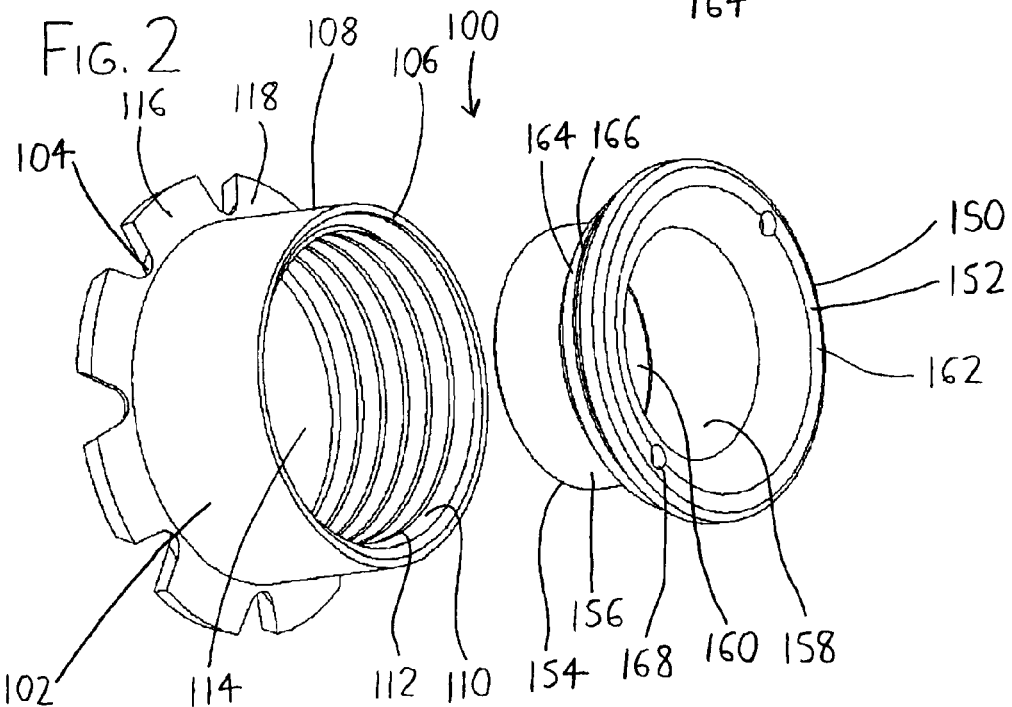

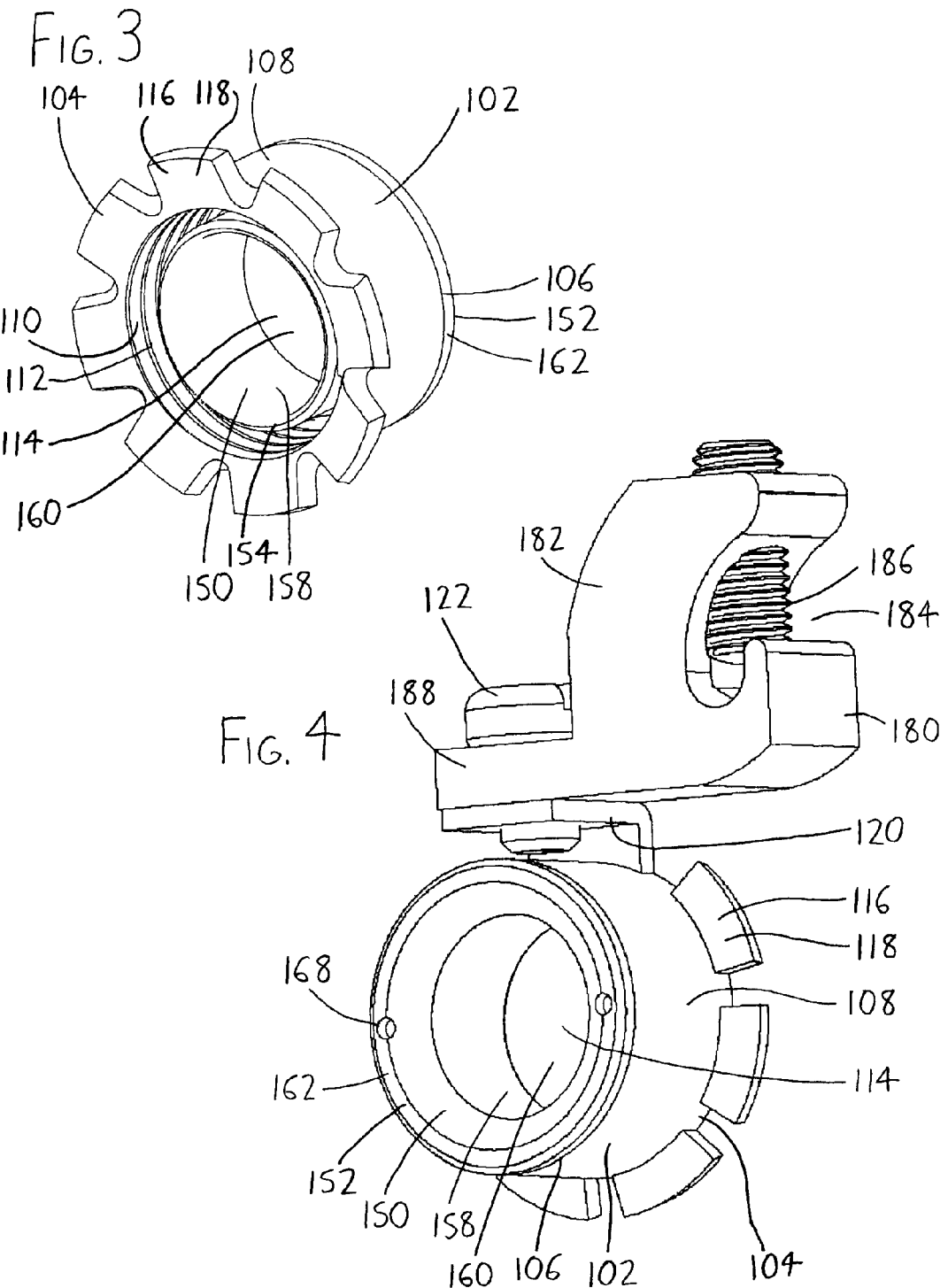

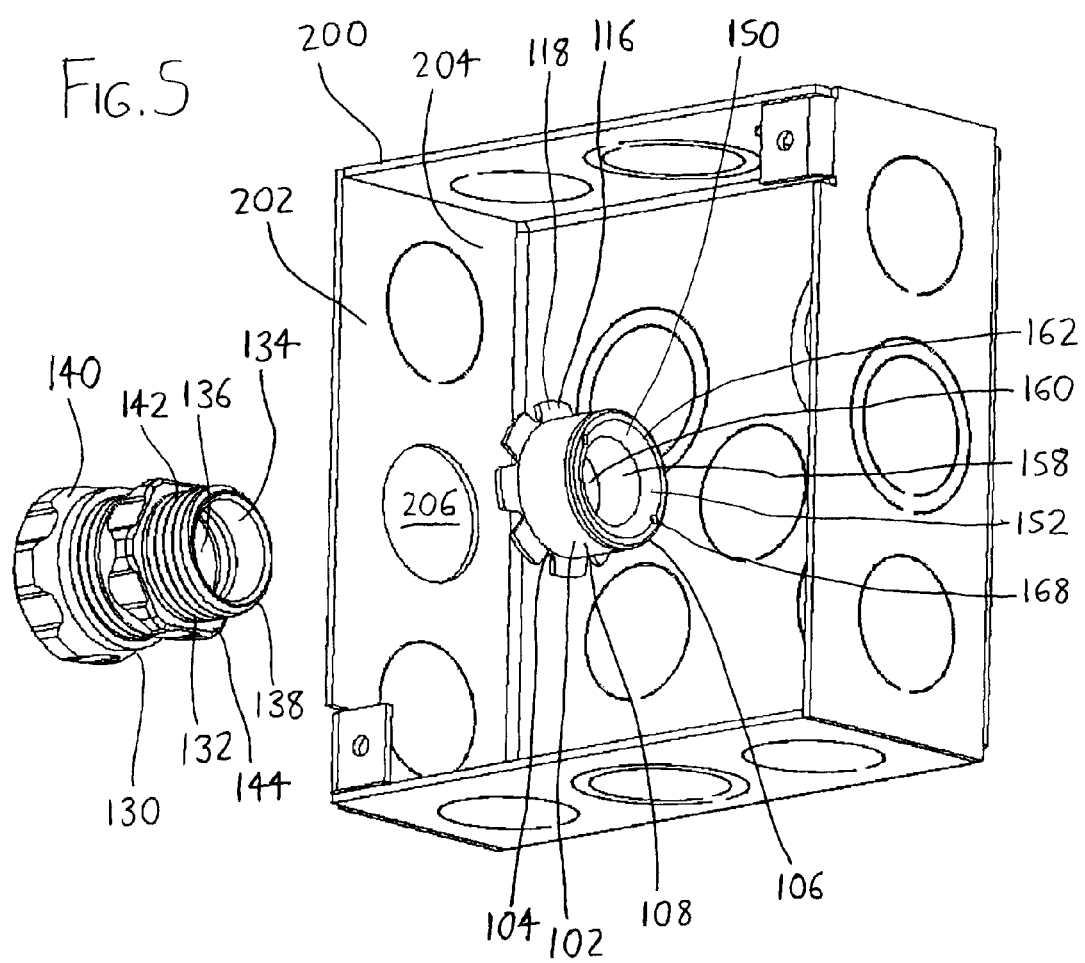

CONNECTOR / BUSHING ASSEMBLY FOR ELECTRICAL JUNCTION BOXES

FIELD OF THE INVENTION

The invention relates generally to fittings or connectors for conduits, such as pipes, tubes, ducts, and the like, and it relates more particularly to connector assemblies for joining electrical conduits.

BACKGROUND OF THE INVENTION

In the electrical trade, junction boxes—small boxes/compartments made of plastic or other materials, with at least one open wall and having entries/apertures defined in other walls—are often installed in buildings at points where electrical wires and/or other cables are to be connected to components such as sockets, switches, outlets, and/or other wires. A junction box is installed at the point where the connection is desired, usually within the building wall or ceiling, by nailing or screwing the junction box to a stud within the wall or ceiling. Cable is then brought to the junction box and extended through a passage in a junction box wall to enter the junction box interior.

In some cases, it is useful to protect the cable within the wall or ceiling, at least where it enters the junction box. For example, cables are often run through pipes or similar conduits between junction boxes so that the pipes/conduits protect the cables from moisture, vermin, or other conditions that might damage the cables or otherwise interfere with transmissions along the cables. As another example, even where pipes/conduits are not used to protect cables between junction boxes, it can be useful to install bushings within the passages in the junction box walls. These bushings present smooth entry/exit points for cables extending through the box wall passages, thereby allowing cable to be more easily run through the passages without catching on the portions of the junction box bounding the passages. These bushings also present attachment points for pipes/conduits, so that pipes/conduits for carrying cables from junction boxes may be readily affixed to the bushings (and thus to the junction boxes).

However, prior bushings manufactured for the aforementioned purposes tend to suffer from a number of disadvantages. Many provide poor protection for the cable at the junction box (e.g., providing a connection at the junction box which is susceptible to moisture, and/or which presents sharp corners/edges within the bushing). Also, many are made of multiple parts which are time-consuming to assemble, and/or which can be difficult to install, particularly when it is considered that bushings must often be installed "blind" (i.e., by touch, without being able to easily see the bushing as it is being installed).

SUMMARY OF THE INVENTION

The invention involves a connector assembly which is intended to at least partially solve the aforementioned problems. To give the reader a basic understanding of some of the advantageous features of the invention, following is a brief summary of an exemplary version of the connector assembly, with reference being made to the accompanying drawings to enhance the reader's understanding. Since this is merely a summary, it should be understood that more details regarding the exemplary version (and other versions) may be found in the Detailed Description set forth elsewhere in this document. The claims set forth at the end of this document then define the various versions of the invention in which exclusive rights are secured.

Referring to the accompanying drawings, an exemplary connector assembly 100 includes a nut 102 for fixing a male connector 130 within a junction box 200 (with the male connector 130 and junction box 200 being shown in FIG. 5), and a liner 150 which fits within the nut 102 to ease insertion and removal of cable through the nut 102 and male connector 130, and also to protect the cable from sharp edges. A grounding clamp 180, shown in FIG. 4, can also be included on the nut 102 to allow connection of a grounding cable to the nut 102 (and thus to the junction box 200). Each of these components will now be discussed in greater detail.

Initially, the junction box 200 may be a standard type, as depicted in FIG. 5, with a series of box walls 202 surrounding a box interior 204, and with box wall passages 206 being defined in one or more of the box walls 202 so that cable may extend through the box wall passage 206 into the box interior 204. The junction box 200 may be formed of metal, plastic, or any other suitable material.

The nut 102, which may also be formed of metal, plastic, and/or other materials, includes a nut junction end 104 (shown best in FIGS. 2 and 3) and an opposing nut entry end 106 (shown best in FIG. 1). An outer nut surface 108, as well as an inner nut surface 110, extends between the nut junction end 104 and nut entry end 106. The inner nut surface 110, which bears nut threading 112, bounds an inner nut passage 114 which extends along the axis of the nut 102 between the nut junction end 104 and nut entry end 106. One or more box wall engagement flanges 116 are situated at or adjacent the nut junction end 104, with the box wall engagement flange(s) 116 extending radially outwardly from the outer nut surface 108 at the nut junction end 104 along a plane oriented at least substantially perpendicular to the axis of the inner nut passage 114. In the exemplary version of the connector assembly 100 depicted in the drawings, the engagement flange 116 is provided as a series of spaced nut teeth 118 which are arrayed circumferentially about the outer nut surface 108 at the nut junction end 104. These spaced nut teeth 118 allow the nut 102 to function in the manner of a lock nut, with the teeth frictionally engaging an adjacent junction box wall 202. To enhance the grip of the nut teeth 118 (or other engagement flange 116), at least a portion of each nut tooth 118 may be inclined in relation to a plane extending perpendicular to the axis of the inner nut passage 114, with the inclined portion extending laterally away from the inner and outer nut surfaces 108 in the axial direction as the nut tooth 118 extends radially away from the nut junction end 104. Thus, the inclined portion of the nut tooth 118 extends away from the nut 102 to better "bite into" the junction box wall 202.

The liner 150, which is preferably formed of plastic but which may be formed of other (preferably nonconductive) materials, has a liner entry end 152 (best seen in FIG. 1) and an opposing liner floating end 154 (best seen in FIG. 2). An outer liner surface 156 extends between the ends 152 and 154, as well as an inner liner surface 158 which surrounds an inner liner passage 160. The liner entry end 152 is situated outside the inner nut passage 114 adjacent the nut entry end 106, and it preferably includes an entry flange 162 at or adjacent the liner entry end 152, with the entry flange 162 extending radially outwardly from the liner 150 and having an outer diameter greater than the inner diameter of the inner nut surface 110. The liner floating end 154 is situated within the inner nut passage 114 when the liner 150 is installed in the nut 102, and it preferably has an at least substantially cylindrical configuration, with an outer diameter spaced radially inwardly from the inner nut surface 110 (as best seen in FIG. 3). An intermediate liner portion 164 located between the liner floating end 154 and liner entry end 152 has an outer diameter greater than the outer diameter of the liner floating end 154 but less than the outer diameter of the entry flange 162. This intermediate liner portion 164 preferably bears liner threading 166, with the threading 166 being configured to complementarily engage the nut threading 112 on the inner nut surface 110. As a result of the foregoing configuration, the liner 150 may be inserted into the inner nut passage 114 at the nut entry end 106, with the liner floating end 154 entering first, and then the intermediate liner portion 164 of the liner 150 may be threaded onto the nut threading 112 on the inner nut surface 110 until the entry flange 162 abuts the nut entry end 106. (Where nut threading 112 and/or liner threading 166 is not present, a friction-fit, snap-fit, or other engagement may be used.) At this point, the entry flange 162 and the intermediate liner portion 164 will be in close abutment with the nut 102, but the liner floating end 154 will be "floating" within the inner nut passage 114, with the liner floating end 154 being radially spaced inwardly from the inner nut surface 110. The inner liner passage 160 preferably smoothly expands in diameter as it extends away from the intermediate liner portion 164 toward the entry flange 162 at the entry end 152, thereby allowing for easier insertion of cable into the entry end 152. Similarly, the inner liner surface 158 is preferably defined by a smooth cylindrical surface between the entry flange 162 and the liner floating end 154 to also assist in cable insertion. As best seen in FIG. 1, the entry flange 162 may bear removal apertures 168 which extend toward the intermediate liner portion 164 so that tools bearing one or more prongs may have their prongs fit within the removal apertures 168 to assist with rotatably removing or installing the liner 150 with respect to the nut 102.

The male connector 130 (see FIG. 5) includes an outer connector surface 132 and an opposing inner connector surface 134. The inner connector surface 134 surrounds an inner connector passage 136 which extends axially between a connector junction end 138 and an opposing connector entry end 140. The connector junction end 138 preferably bears connector threading 142, and is sized to be received in a box wall passage 206 of the junction box 200. The connector junction end 138 is also configured to fit within the inner nut passage 114 at the nut junction end 104, with the connector junction end 138 being situated between the liner 150 (more specifically, the liner floating end 154) and the nut 102 (more specifically, the nut junction end 104), and with the liner floating end 154 being situated within the inner connector passage 136. In this arrangement, the connector threading 142 complementarily engages the nut threading 112 within the inner nut passage 114. Thus, the nut 102 engages the male connector 130 on the opposite side of the box wall 202 of the junction box 200, with the nut 102 fit over the connector junction end 138, and with the box wall engagement flanges 116 (e.g., nut teeth 118) of the nut 102 engaging the box wall 202. At the same time, the liner 150 extends within the inner nut passage 114 from the nut entry end 106, and into the inner connector passage 136. The liner 150 therefore insulates any cable extending therein from the nut 102 (assuming the liner is nonconductive), deters moisture from entering the inner nut and connector passages 114 and 136 via the seam between the nut 102 and the male connector 130, and also helps to eliminate sharp edges bounding or within the nut and connector passages 114 and 136 which might interfere with insertion and/or removal of cable.

When grounding of the junction box 200 and/or the nut 102 is desired, the nut 102 may include a grounding clamp 180, an exemplary version of which is illustrated in FIG. 4. The grounding clamp 180 may be connected to extend from the outer nut surface 108, and may include a grounding wire receiver 182 having a concave mouth 184 sized to receive a grounding wire. A pin 186 can adjustably extend from the receiver 182 into the mouth 184 to clamp any grounding wire within the mouth 184 against the receiver 182, as by threadably extending the pin 186 into the mouth 184. The grounding clamp 180 is preferably rotatably connected to the outer nut surface 108 so that it may be rotated into a desired orientation, as by providing the receiver 182 on a lug 188 which extends adjacent the nut 102, and rotatably fixing the lug 188 to the nut 102 via a fastener.

Further advantages, features, and objects of the invention will be apparent from the remainder of this document in conjunction with the associated drawings.

BRIEF DESCRIPTION OF THE DRAWINGS

FIG. 1 is an exploded perspective view of an exemplary version of the invention, showing a nut 102 and liner 150, with the liner floating end 154 being shown spaced from the nut entry end 106 into which it may be inserted.

FIG. 2 is an exploded perspective view of the nut 102 and liner 150 of FIG. 1 shown from a different vantage point.

FIG. 3 is an assembled perspective view of the nut 102 and liner 150 of FIGS. 1 and 2 shown from yet another vantage point, and showing the liner floating end 154 within the inner nut passage 114 spaced from the inner nut surface 110 so that the connector junction end 138 (FIG. 5) of a male connector 130 (FIG. 5) may be received between the liner floating end 154 and the inner nut surface 110 when the connector junction end 138 (FIG. 5) is inserted within the nut junction end 104.

FIG. 4 is an assembled perspective view of the nut 102 and liner 150 of FIG. 3 shown with a grounding clamp 180 provided on the nut 102, with the grounding clamp 180 having a grounding wire receiver 182 for receiving a grounding wire within its mouth 184 (with the grounding wire subsequently being attachable to the receiver 182 by extending the pin 186 into the mouth 184), and with the receiver 182 having an extending lug 188 rotatably attached to a clamp mount 120 on a nut tooth 118 via a fastener 122 (with the grounding clamp 180 and clamp mount 120 being removed in the other FIGS. 1-3 and 5).

FIG. 5 is a perspective view of the assembled nut 102 and liner 150 of FIG. 3 shown within an exemplary junction box 200, and an exemplary male connector 130 shown outside the junction box 200, in ready-to-assemble positions wherein the connector junction end 138 may be inserted within the box wall passage 206, and the nut 102 may then be threaded thereon, with the connector junction end 138 extending within the nut junction end 104.

DETAILED DESCRIPTION OF PREFERRED VERSIONS OF THE INVENTION

Referring particularly to FIG. 5 to assist in visualizing the invention, the connector assembly 100 may be installed in the junction box 200 in the following manner. Initially, the male connector 130 may have its threaded connector junction end 138 inserted into the box wall passage 206 of the junction box 200 by some desired amount. In this respect, the exemplary male connector 130 of FIG. 5 is shown with an insertion flange 144 next to its connector junction end 138, with the insertion flange 144 limiting insertion of the junction end 138 into the box wall passage 206 (i.e., the connector junction end 138 may be inserted into the box wall passage 206 until the insertion flange 144 interferes with the box wall 202). The nut 102 may then be threaded onto the connector junction end 138, with the connector junction end 138 being received within the inner nut passage 114 to engage the nut threading 112 on the inner nut surface 110 (best seen in FIG. 3). As this is done, the box wall 202 is sandwiched between the insertion flange 144 of the male connector 130 and the box wall engagement flange 116 of the nut 102 (i.e., the nut teeth 118). The connector junction end 138 extends within the inner nut passage 114 and is situated between the liner floating end 154 and the nut junction end 104. As a result, a passage for insertion of cable is defined through the nut 102 and male connector 130, and it is bounded only by the liner 150 and the inner connector passage 136, and not by the inner nut surface 110, which is situated outside of the liner 150. Since the liner 150 covers the connector junction end 138 within the inner nut passage 114, the liner 150 usefully helps to prevent the entry of moisture from the seam between the connector junction end 138 and the nut 102, and it additionally helps to provide an at least substantially smooth and continuous inner passage extending between the nut 102 and the male connector 130 for easy insertion and removal of cable. (Here it is also useful if the diameter of the inner connector passage 136 of the male connector 130 outside the connector junction end 138 is at least substantially the same as the diameter of the inner liner passage 160, since this will further provide an at least substantially smooth and continuous inner passage extending between the nut 102 and the male connector 130.) Insertion and removal of cable is further eased at the nut entry end 106 if the liner 150 has a liner entry end 152 with a wide mouth narrowing onto the inner liner passage 160, which effectively serves to "funnel" cable into the inner liner passage 160 and inner connector passage 136.

It should be understood that the exemplary version of the invention described above and shown in the drawings is merely a preferred version of the invention, and the invention may be configured and dimensioned differently from this exemplary preferred version, and/or can be modified in a number of other respects. Several examples follow.

Initially, the male connector 130 can assume a wide variety of configurations different from the one shown in FIG. 5. As a first example, the male connector 130 is depicted with an entry end 140 configured as an internally-threaded female end (this female threading not being shown in FIG. 5), so that the threaded end of a pipe/conduit for carrying cable may be inserted and affixed therein. However, the connector entry end 140 could assume other forms, such as that of a simple cylindrical pipe/conduit to which other pipe/conduit sections might be attached. Alternatively, the connector entry end 140 may itself be an elongated section of pipe/conduit for carrying cable, i.e., the nut 102 could effectively be affixed directly to a junction end 138 formed at the end of a pipe/conduit. As a second example, a clamp may be formed on or within the male connector 130 for affixing a cable within the inner connector passage 136. This could be done, for example, by extending a threaded fastener through the outer connector surface 132 and into the inner connector passage 136 so that threading the fastener into the passage 136 will clamp a cable within the passage 136 to the inner connector surface 134 opposite the fastener.

Similarly, the nut 102 may assume a wide variety of configurations other than the ones shown and described. As one example, the grounding clamp 180 could be fixed directly to the outer nut surface 108 rather than to a clamp mount 120 extending from a nut tooth 118. As another example, the grounding clamp 180 need not be rotatably affixed to nut 102 and it could simply extend from the outer nut surface 108 as an integrally molded part of the nut 102. Clamping mechanisms other than the mouth 184 and clamping pin 186 are also possible, e.g., spring-loaded jaws/clamps, posts around which grounding wires may be wrapped and tightened down, etc. The engagement flange 116 can assume a variety of forms, e.g., it could assume the form of a continuous annular surface rather than being segmented into teeth 118. If the engagement flange 116 is segmented into teeth 118, the teeth may be formed as illustrated or in other forms, such as in the form of spikes/barbs or other shapes.

Other components can also be used in conjunction with the connector assembly 100. As an example, a plastic or other nonconductive connector liner could also be used within the male connector 130, with this connector liner resting adjacent the inner connector surface 134 to bound the inner connector passage 136, and preferably extending from the connector entry end 140 to abut or rest over the liner floating end 154 of the liner 150. Such a connector liner would therefore serve to further insulate cable from the male connector 130 and nut 102, and to further protect the cable from moisture entering between the male connector 130 and nut 102.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A connector assembly including:
   a. a nut having inner and outer nut surfaces extending between a nut junction end and a nut entry end, wherein:
      (1) the inner nut surface:
         (a) bounds an inner nut passage extending axially between the nut junction end and nut entry end, and
         (b) bears inner nut threading;
      (2) a series of nut teeth are provided at or adjacent the nut junction end, the nut teeth:
         (a) being arrayed about the outer nut surface to extend radially outwardly therefrom, and
         (b) extending laterally away from the inner and outer nut surfaces in the axial direction;
   b. a liner having inner and outer liner surfaces extending between a liner entry end and a liner floating end, wherein:
      (1) the outer liner surface at the liner floating end:
         (a) is defined by an at least substantially cylindrical surface, and
         (b) has an outer diameter less than the inner diameter of the inner nut surface;
      (2) the liner entry end includes an entry flange:
         (a) extending radially outwardly from the liner, and
         (b) having an outer diameter greater than the inner diameter of the inner nut surface;
      (3) an intermediate threaded portion is situated between the liner floating end and the entry flange, wherein the intermediate threaded portion:
         (a) bears external liner threading sized to complementarily engage the inner nut threading of the inner nut surface,
         (b) has an outer diameter:
            (i) greater than the outer diameter of the liner floating end, and
            (ii) less than the outer diameter of the entry flange, and
         (c) is spaced away from the liner floating end by at least half of the length of the liner, as measured between the liner entry end and the liner floating end.

2. The connector assembly of claim 1 wherein the outer nut surface is defined by a smooth cylindrical surface.

3. The connector assembly of claim 1 wherein the outer diameter of the entry flange is at least substantially equal to the outer diameter of the outer nut surface.

4. The connector assembly of claim 1 wherein the inner liner surface is defined by a smooth cylindrical surface between the entry flange and the liner floating end.

5. The connector assembly of claim 1 wherein the inner liner surface within the entry flange expands in diameter as it extends away from the intermediate threaded portion toward the liner entry end.

6. The connector assembly of claim 1 wherein the entry flange bears two or more apertures therein, the apertures extending toward the intermediate threaded portion.

7. The connector assembly of claim 1 wherein the nut includes:
   a. a grounding clamp extending from the outer nut surface, the grounding clamp having a concave mouth defined therein;
   b. a pin extending from the grounding clamp into the mouth.

8. The connector assembly of claim 7 wherein the grounding clamp is rotatably connected to the outer nut surface.

9. The connector assembly of claim 1 wherein the nut includes:
   a. a fastener extending from the nut, and
   b. a grounding clamp having:
      (1) a receiver having a concave mouth opening thereon, and
      (2) a lug extending between the fastener and the receiver.

10. The connector assembly of claim 9 wherein the receiver includes a pin threadably extendable into the mouth.

11. The connector assembly of claim 1 further including a male connector having inner and outer connector surfaces extending between a connector junction end and a connector entry end, wherein
   a. the inner connector surface bounds an inner connector passage extending axially between the connector junction end and connector entry end;
   b. the outer connector surface at the connector junction end bears connector threading, with the connector junction end being configured to fit within the inner nut passage of the nut at the nut junction end, and with:
      (1) the threaded outer connector surface complementarily coupled to the nut threading within the inner nut surface, and
      (2) the liner floating end situated within the inner connector passage, with the connector junction end being situated between the liner floating end and the nut junction end.

12. The connector assembly of claim 11 further including a junction box having a series of box walls surrounding a box interior, with a box wall passage being defined in one of the box walls,
   a. wherein the connector juncture end of the male connector extends into the box wall passage, and
   b. the nut is fit around the connector juncture end of the male connector with the nut teeth engaging the box wall in which the box wall passage is defined.

13. A connector assembly including:
   a. a nut having a nut junction end, an opposing nut entry end, and inner and outer nut surfaces extending therebetween, wherein:
      (1) the inner nut surface surrounds an inner nut passage extending axially between the nut junction end and nut entry end;
      (2) a box wall engagement flange is situated at or adjacent the nut junction end, the box wall engagement flange extending radially from the outer nut surface, with the flange being oriented at least substantially perpendicular to the axis of the inner nut passage;
   b. a liner having a liner floating end, an opposing liner entry end, and inner and outer liner surfaces extending therebetween, wherein:
      (1) the liner floating end is situated within the inner nut passage with its outer liner surface spaced radially inwardly from the inner nut surface;
      (2) the liner entry end is situated outside the inner nut passage adjacent the nut entry end;
      (3) a portion of the outer liner surface between the liner floating end and liner entry end is engaged to the inner nut surface between the nut junction end and nut entry end;
   c. a male connector having a connector junction end, an opposing connector entry end, and inner and outer connector surfaces extending therebetween, with the connector junction end being situated within the inner nut passage, with the connector junction end being situated between the liner floating end and the nut junction end.

14. The connector assembly of claim 13 wherein the box wall engagement flange is defined by a series of circumferentially spaced nut teeth.

15. The connector assembly of claim 13 wherein at least a portion of the box wall engagement flange:
   a. is inclined in relation to a plane extending perpendicular to the axis of the inner nut passage, and
   b. extends laterally away from the outer nut surface.

16. The connector assembly of claim 13 wherein the portion of the outer liner surface engaged to the inner nut surface is threadedly engaged to the inner nut surface.

17. A connector assembly including:
   a. a nut having a nut junction end, an opposing nut entry end, and inner and outer nut surfaces extending therebetween, with the inner nut surface bearing nut threading and surrounding an inner nut passage extending axially between the nut junction end and nut entry end;
   b. a liner having a liner floating end, an opposing liner entry end, and inner and outer liner surfaces extending therebetween, wherein:
      (1) the liner floating end is:
         (a) situated within the inner nut passage, and
         (b) at least substantially cylindrical, with an outer diameter spaced radially inwardly from the inner nut surface;
      (2) the liner entry end is situated outside the inner nut passage adjacent the nut entry end;
      (3) the liner includes liner threading on its outer liner surface between the liner floating end and liner entry end, with the liner threading engaging the nut threading on the inner nut surface;
   c. a male connector having a connector junction end, an opposing connector entry end, and inner and outer connector surfaces extending therebetween, with the connector junction end:
      (1) being situated within the inner nut passage, with the connector junction end being situated between the liner floating end and the nut junction end;
      (2) bearing external connector threading, with the connector threading engaging the nut threading within the inner nut passage.

18. The connector assembly of claim 17 wherein the nut junction end includes a box wall engagement flange extending radially outwardly therefrom, wherein the box wall engagement flange is oriented at least substantially perpendicular to the axis of the inner nut passage.

19. The connector assembly of claim 18 wherein the box wall engagement flange is defined by a series of circumferentially spaced nut teeth.

20. The connector assembly of claim 19 wherein at least a portion of each nut tooth extends laterally away from the outer nut surface as the nut tooth extends radially away from the nut junction end.

* * * * *